United States Patent
Hauser et al.

(10) Patent No.: US 6,340,295 B1
(45) Date of Patent: Jan. 22, 2002

(54) PISTON PUMP FOR A VEHICLE BRAKE SYSTEM HAVING RADIAL PLAY BETWEEN A CLOSURE ELEMENT AND A BUSH

(75) Inventors: Manfred Hauser, Schwieberdingen; Norbert Alaze, Markgroeningen; Dieter Merklein, Kempten; Wolfgang Schuller, Sachsenheim; Julius Bayrhof, Lindenberg; Walter Kremsreiter, Hindelang; Joachim Evertz, Sonthofen; Joerg Zielke, Immenstadt; Ralf Zitzelsberger, Marktoberdorf; Andreas Weh, Durach; Bernd Allenzon, Wiggensbach; Michael Hellebrandt, Burgberg, all of (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 09/269,669

(22) PCT Filed: Jun. 18, 1998

(86) PCT No.: PCT/DE98/01670

§ 371 Date: Sep. 13, 1999

§ 102(e) Date: Sep. 13, 1999

(87) PCT Pub. No.: WO99/06706

PCT Pub. Date: Feb. 11, 1999

(30) Foreign Application Priority Data

Jul. 30, 1997 (DE) .......................................... 197 32 770

(51) Int. Cl.$^7$ ................................................ F04B 19/00
(52) U.S. Cl. ....................... 417/470; 417/549; 417/554; 417/569
(58) Field of Search ................................. 417/549, 569, 417/554, 470; 92/171.1

(56) References Cited

U.S. PATENT DOCUMENTS

| | | | | |
|---|---|---|---|---|
| 5,123,819 A | * | 6/1992 | Schuller et al. | 417/569 |
| 5,395,219 A | * | 3/1995 | Hosoya et al. | 417/549 |
| 5,588,817 A | * | 12/1996 | Zirps et al. | 417/549 |
| 6,113,365 A | * | 9/2000 | Siegel | 417/554 |

* cited by examiner

Primary Examiner—Cheryl J. Tyler
(74) Attorney, Agent, or Firm—Ronald E. Greigg

(57) ABSTRACT

A piston pump intended especially for use in a slip-controlled hydraulic vehicle brake system. The piston pump is inserted into a cylinder bore, the piston pump has a piston, a bush, and a closure element that tightly closes the cylinder bore. The closure element is joined radially movably to the bush, for instance via caulking. This joint has the advantage that the piston pump can be assembled into a compact, easily manipulated, and sturdy component unit, and that the closure element and the bush are aligned with one another on being inserted into the cylinder bore.

9 Claims, 3 Drawing Sheets

PISTON PUMP FOR A VEHICLE BRAKE SYSTEM HAVING RADIAL PLAY BETWEEN A CLOSURE ELEMENT AND A BUSH

PRIOR ART

The invention relates to a piston pump for a vehicle brake system.

Many such piston pumps are known. The piston pump known from German Patent Disclosure DE 41 07 979 A1 can be taken as an example. The known piston pump has a piston which is axially displaceably guided in a bush that is inserted into a cylinder bore of a pump housing. A closure element in the form of a cap is inserted into the cylinder bore and closes it in pressure-tight fashion. A disadvantage is that the bush and the closure element have to be inserted into the cylinder bore in separate steps.

ADVANTAGES OF THE INVENTION

In the piston pump of the invention, the closure element is joined to the bush and there is radial play between the closure element and the bush. The bush is inserted, jointly with the closure element secured to it, into the cylinder bore in a single step, and is secured in the cylinder bore and sealed off in pressure-tight fashion by caulking, for example. The piston pump of the invention has the advantage that it is preassembled in final form before being inserted into the pump housing, and forms a compact, easily manipulated, and sturdy component unit. A mechanically overdefined mounting of the bush, with the closure element secured to it, in the cylinder bore of the pump housing is avoided. This prevents strains that could be caused by an alignment error between the closure element and the bush. The mechanical strength of the mounting in the cylinder bore is increased, as is the security against leaking.

The piston pump is intended in particular as a pump in a brake system of a vehicle and is used in controlling the pressure in wheel brake cylinders. Depending on the type of brake system, the abbreviations ABS, ASR, FDR and EHB are used for such brake systems. In the brake system, the pump serves for instance to return brake fluid from one or more wheel brake cylinders to a master cylinder (ABS) and/or to pump brake fluid out of a supply container into one or more wheel brake cylinders (ASR or FDR or EHB). The pump is needed for instance in a brake system with wheel slip control (ABS or ASR) and/or a brake system serving as a steering aid (FDR) and/or an electrohydraulic brake system (EHB). With wheel slip control (ABS or ASR), locking of the wheels of the vehicle during a braking event involving strong pressure on the brake pedal (ABS) and/or spinning of the driven wheels of the vehicle in the event of strong pressure on the gas pedal (ASR) can for instance be prevented. In a brake system serving as a steering aid (FDR), a brake pressure is built up in one or more wheel brake cylinders independently of an actuation of the brake pedal or gas pedal, for instance to prevent the vehicle from breaking out of the lane desired by the driver. The pump can also be used in an electrohydraulic brake system (EHB), in which the pump pumps the brake fluid into the wheel brake cylinder or wheel brake cylinders if an electric brake pedal sensor detects an actuation of the brake pedal, or in which the pump is used to fill a reservoir of the brake system.

BRIEF DESCRIPTION OF THE DRAWINGS

The invention will be described in further detail below in terms of an exemplary embodiment shown in the drawing. Shown are FIG. 1, a piston pump of the invention in axial section.

DESCRIPTION OF THE EXEMPLARY EMBODIMENT

Figure 1:
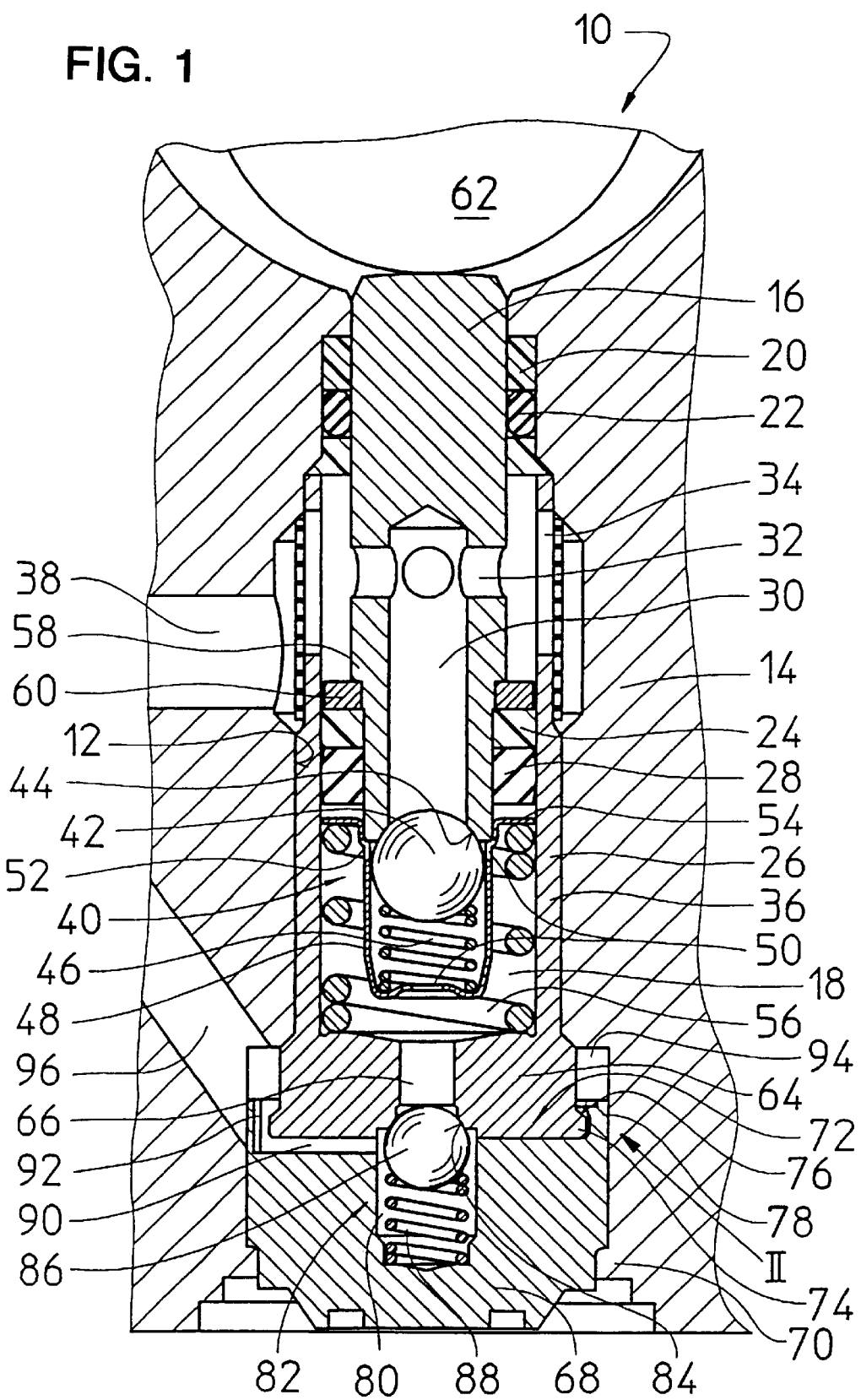

The piston pump of the invention, shown in FIG. 1 and identified overall by reference numeral 10, is inserted into a stepped cylinder bore 12, which is mounted in a hydraulic block that forms a pump housing 14. The hydraulic block, of which only a fraction surrounding the piston pump 10 is shown in the drawing, is part of a slip-controlled hydraulic vehicle brake system, not otherwise shown. Besides the piston pump 10, other hydraulic components, such as magnet valves or pressure reservoirs, are inserted into it and connected hydraulically to one another and to the piston pump 10 of the invention.

The piston pump 10 has a piston 16, one end of which, remote from the positive-displacement chamber 18, is guided in the pump housing 14 with a guide ring 20 and is sealed off with a sealing ring 22. Another end of the piston 16, oriented toward the positive-displacement chamber 18, is guided with a guide ring 24 in a bush 26 of the piston pump 10 and sealed off with a sealing ring 28. The bush 26 is inserted with a press fit into the cylinder bore 12 of the pump housing 14. The press fit effects sealing between the inlet and outlet sides, that is, between the low- and high-pressure sides of the piston pump 10.

For the pump inlet, an axial blind bore 30 is made in the piston 16 from the side toward the positive-displacement chamber; near its bottom, this bore is intersected by transverse bores 32. The blind and transverse bores 30, 32 communicate, through windows 34 in a circumferential wall 36 of the bush 24, with an inflow bore 38 which is mounted radially to the piston pump 10 in the hydraulic block that forms the pump housing 14.

A check valve in the form of an inlet valve 40 is mounted on the end of the piston 16 toward the positive-displacement chamber. The inlet valve 40 has a valve ball 42 as its valve closing body, which cooperates with a conical valve seat 44 that is provided at an orifice of the blind bore 30 of the piston 16. A helical compression spring, as the valve closing spring 46, presses the valve ball 42 against the valve seat 44. The valve ball 42 and the valve closing spring 46 are received in a valve housing 48, which is made as a cup-shaped deep-drawn sheet-metal part with a diameter approximately equivalent to the diameter of the piston 16 and is provided with flow openings 50. The valve housing 48 has an annular shoulder 52, with which it rests on a face end of the piston 16 oriented toward the positive-displacement chamber 18. It has an outward-protruding radial flange 54 which is integral with it and against which a helical compression spring serving as a piston restoring spring 56 presses, and in this way keeps the valve housing 48 on the piston 16. At the same time the radial flange 54, between itself and a support ring 60, braced on an annular shoulder 58 of the piston 16, holds the guide ring 24 and the sealing ring 28 axially on the piston 16.

Via the radial flange 54 of the valve housing 48, the piston restoring spring presses the piston 16 axially against an eccentric element 62 that can be driven by an electric motor and that serves to drive the piston 16 in a manner known per se so to execute a reciprocating stroke motion.

On one side of the positive-displacement chamber, the bush 26 has a bush bottom 64, which is integral with the bush and in which a continuous center hole 66 is made for the pump outlet.

On the side toward the positive-displacement chamber, a closure element 68 in the form of a cylindrical plug is inserted into the cylinder bore, secured by caulking 70 and sealed off in fluid-tight fashion. At the same time, the closure element 68 keeps the bush 26 in the cylinder bore 12.

On a face end of the closure element 68 toward the bush 26, there is a flat, preferably cylindrical recess 72 in the closure element 68, and the bush 26 is inserted by its end into this recess. There is radial play between the recess 72 and the bush 26, so that the closure element 68 is radially movable relative to the bush 26. The bush 26 and the closure element 68 align themselves with one another upon being inserted into the cylinder bore 12.

Figure 2:
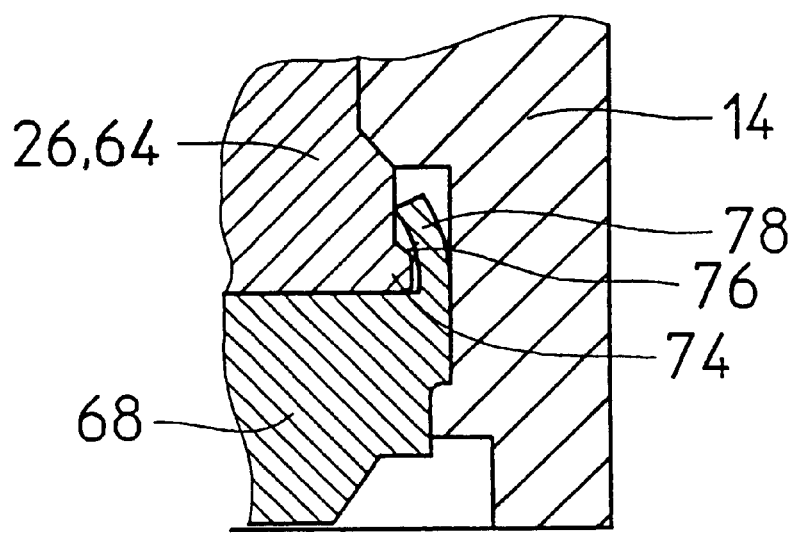
FIG. 2, a detail of a modified embodiment indicated by the arrow II in FIG. 1.

For securing the closure element 68 in the bush 26, the bush 26 has an outward-protruding radial collar 74 on its end inserted into the closure element 68; this collar forms an undercut 76, which is engaged from behind by an edge 78 of the recess 72 of the closure element 68. To put the edge 78 into engagement with the undercut 76 from behind, this edge is deformed radially inward, for instance by caulking, or as shown in FIG. 2 by crimping. In this way, the closure element 68 is secured on the bush 26 with radial play. For securing the closure element, caulking or crimping at three to four points along the circumference is sufficient.

An axial blind bore 80 is made in the closure element 68 on a bottom of the recess 72; the check valve in the form of an outlet valve 82 is accommodated in this bore and cooperates with a conical valve seat 84 which is mounted at an orifice, toward the closure element 68, of the center hole 66 in the bush bottom 64. A valve ball 86 is inserted as a valve closing body into the blind bore 80 of the closure element 68 and is pressed against the valve seat 84 by a helical compression spring 88 acting as the valve closing spring.

Figure 3:
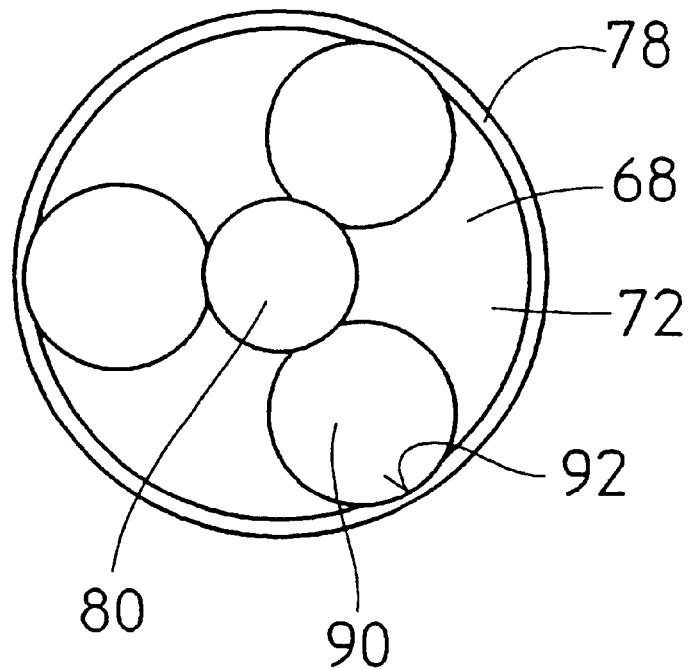
FIG. 3, an end view of an inside of a closure element of the piston pump shown in FIG. 1.

As the pump outlet, three circular indentations 90 are distributed equidistantly in the bottom of the recess 72 of the closure element 68 (FIG. 3). From the blind bore 80, which when the valve ball 86 is opened communicates with the center hole 66 in the bush bottom 64, these indentations 90 extend inward to the outside into the edge 78 that surrounds the recess 72. The indentations 90 continue axially in the edge 78 in the form of round grooves 92. The round grooves 92 discharge on one open face end of the recess 72 into an annular conduit 94, which is enclosed between the pump housing 14, the bush 26, and the closure element 68. From the annular conduit 94, an outlet bore 96 leads away in the hydraulic block that forms the pump housing 14. The circular indentations 90 at the bottom of the recess 72 of the closure element 58 and the round grooves 92 in the edge 78 of the closure element 68 form grooves that extend continuously outward from an interior of the piston pump 10 and that are covered by the bush bottom 54 so as to form outlet conduits 90, 92 that are bent at an angle. To form the outlet conduits, grooves can also be provided for instance in the bottom of the recess 72 of the closure element 68, and these grooves then extend directly outward without being angled, in the form of openings (not shown) that are open toward the open face end of the recess 72 and penetrate the edge 78 of the recess 72.

Figure 4:
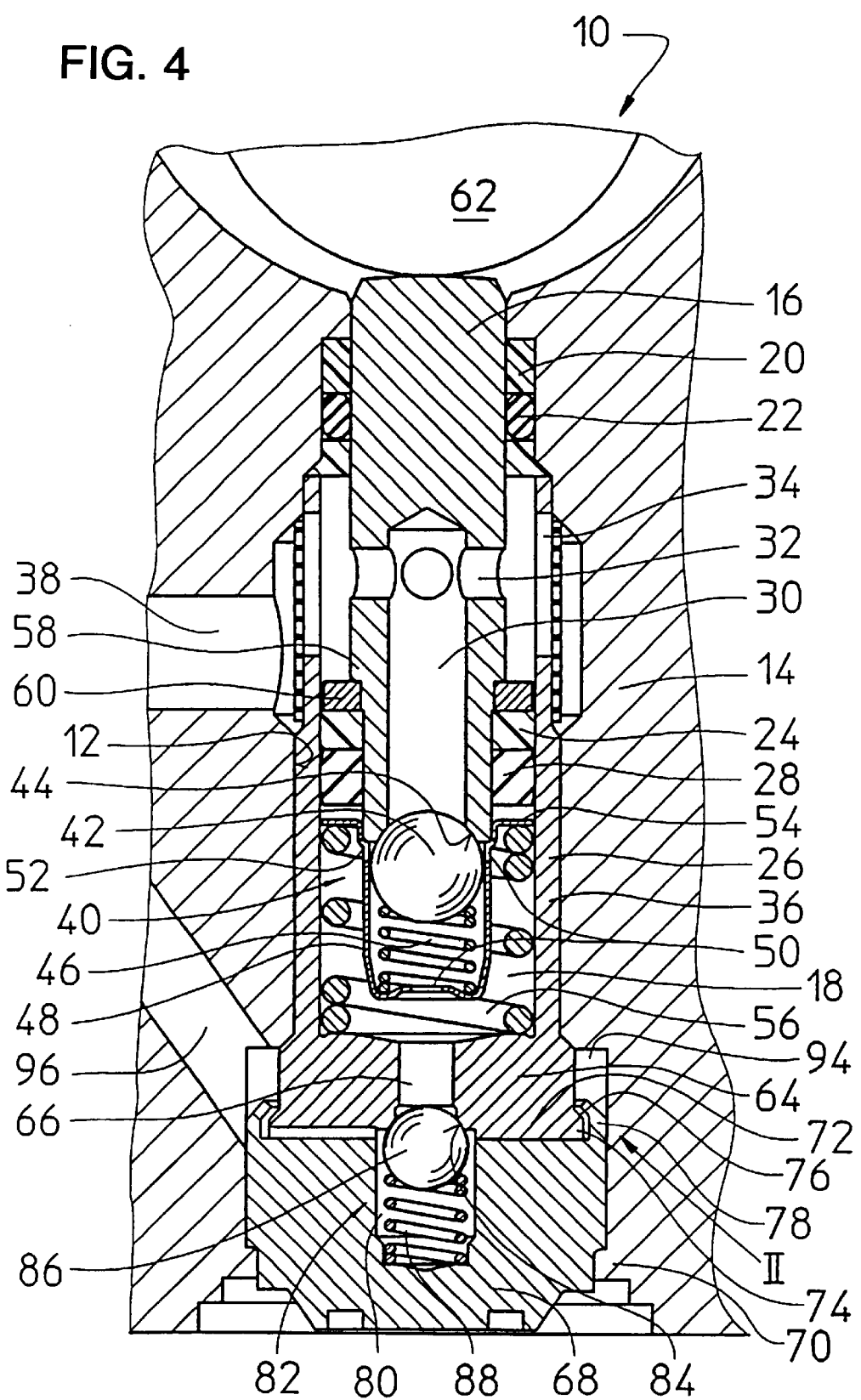
FIG. 4 illustrates a modification of the device shown in FIG. 1.

FIG. 4 is a modification of the device shown in FIG. 1 in which a groove has been formed in the end face of the bush 26 rather than the end face of the closure element 68 as shown in FIG. 1. The groove in the end of the bush serves the same purpose as the groove in the closure element as set forth above.

Instead of the radial collar 74 that protrudes outward, an undercut 76 may for instance also be formed by a groove extending all the way around or by individual indentations in the circumference of the bush 26.

The foregoing relates to a preferred exemplary embodiment of the invention, it being understood that other variants and embodiments thereof are possible within the spirit and scope of the invention, the latter being defined by the appended claims.

We claim:

1. A method for removing organic and/or inorganic contaminants from an aqueous feed stream comprising contacting said aqueous feed stream with a membrane formed from a porous, crystalline titanium silicate, recovering a permeate rich in water and forming a retentate having a contaminant concentration greater than said aqeous stream, said titanium silicate composed of chains of six oxygen-coordinated titanium octahedra, which chains are connected three dimensionally by tetrahedral silicone oxide units bridging titanosilicate units.

2. The piston pump according to claim 1, in which the closure element (68) is mounted on one side of a positive-displacement chamber in the cylinder bore (12).

3. The piston pump according to claim 1, in which the closure element (68) is radially movably joined to the bush (26) by a deforming operation.

4. The piston pump according to claim 1, in which the closure element (68) has a recess (72) into which one end of the bush (26) is inserted with radial play, and that the closure element (68), with an edge (78) of the recess, engages an undercut (76) of the bush (26).

5. The piston pump according to claim 1, in which the bush (26) has a bush bottom (65) integral with the bush, said bush bottom is provided with a fluid opening (66) that has a valve seat (84).

6. The piston pump according to claim 5, in which a check valve (82) cooperates with the valve seat (84) of the bush bottom (64) and is disposed in the closure element (68).

7. The piston pump according to claim 1, in which the closure element (68) has a groove, leading from an inside outward, in a face oriented toward the bush (26), that the groove is covered by the bush (26) to form one of an outlet and an inlet conduit (90, 92) of the piston pump (10).

8. The piston pump according to claim 1, in which one of the closure element (68) and the bush (26) has a groove, leading from an inside outward, in a face oriented toward each other, th at th e groove is covered by one of an end of the closure element (68) and an end of the bush (26) to form one of an outlet and an inlet conduit (90, 92) of the piston pump (10).

9. The piston pump according to claim 1, in which the bush (26) has a groove, leading from an inside outward, in a face oriented toward the closure element (68), that the groove is covered by the closure element (68) to form one of an outlet and an inlet conduit (90, 92) of the piston pump (10).

* * * * *